United States Patent [19]

Song

[11] Patent Number: 5,038,388
[45] Date of Patent: Aug. 6, 1991

[54] METHOD FOR ADAPTIVELY SHARPENING ELECTRONIC IMAGES

[75] Inventor: Woo-Jin Song, Waltham, Mass.

[73] Assignee: Polaroid Corporation, Cambridge, Mass.

[21] Appl. No.: 351,930

[22] Filed: May 15, 1989

[51] Int. Cl.$^5$ .............................................. G06K 9/40
[52] U.S. Cl. .......................................... 382/54; 382/51
[58] Field of Search ............................. 382/17, 51, 54; 358/166

[56] References Cited

U.S. PATENT DOCUMENTS

| | | | |
|---|---|---|---|
| 4,072,928 | 2/1978 | Wilder | 382/54 |
| 4,334,244 | 6/1982 | Chan et al. | 358/166 |
| 4,517,607 | 5/1985 | Ohkouchi et al. | 382/54 |
| 4,532,548 | 7/1985 | Zwirn | 382/42 |
| 4,633,504 | 12/1986 | Wihl | 358/106 |
| 4,683,496 | 7/1987 | Tom | 382/54 |
| 4,783,840 | 11/1988 | Song | 382/54 |
| 4,941,190 | 7/1990 | Joyce | 382/54 |
| 4,945,502 | 7/1990 | Kwon et al. | 382/51 |

OTHER PUBLICATIONS

"Digital Image Enhancement and Noise Filtering by Use of Local Statistics", by Jong-Sen Lee, IEEE Transactions on Pattern Analysis and Machine Intelligence, vol. PAMI-2, No. 2, Mar. 1980, pp. 440-443.

Primary Examiner—David K. Moore
Assistant Examiner—Jose L. Couso
Attorney, Agent, or Firm—Edward S. Roman

[57] ABSTRACT

Method and apparatus for sharpening edges and details of a digital image without amplifying noise in the digital image provide an output image which is the sum of the input image and its adaptively-amplified high frequency components, which adaptively amplified high frequency components are obtained by subtracting a low-pass filtered image from the input image. An adaptive amplification factor for the high frequency components is determined as a function of a variance of the pixel values surrounding a pixel and the noise power of the imaging system.

16 Claims, 6 Drawing Sheets

N=9

N=25

N=8

N=15

N=9

N=32

N=8

N=16

CONTINUOUS ADAPTATION

BINARY DECISION

TERNARY DECISION

M-ARY DECISION

METHOD FOR ADAPTIVELY SHARPENING ELECTRONIC IMAGES

BACKGROUND OF THE INVENTION

1. Field of the Invention

The present invention pertains generally to a method and apparatus for sharpening an image digitally and, in particular, to a robust method for sharpening edges and details of an image digitally without amplifying noise in the input image.

2. Description of the Prior Art

Electronic imaging cameras for recording either motion or still images are well known in the art and in common usage today. Such cameras generally include a two-dimensional photosensitive array which may comprise a high resolution charge coupled device (CCD) or charge injection device (CID) which receives image scene light in a well-known manner by way of an objective lens and shutter. The image sensing array typically comprises a plurality of image sensing elements or pixels arranged in a two-dimensional area array with each image sensing pixel converting the image defining scene light into a corresponding analog voltage value. The image sensing elements are preferably arranged in a plurality of columns and rows and for today's resolution imaging applications may include more than 1,000 columns by 500 rows of image sensing pixels.

When an image is captured by an imaging system, the pixel values are always degraded by random noise from various sources. For example, an image scanned from a print or a film may contain film-grain noise. Actually, it is impossible to conceive of an absolutely noiseless system because of the discrete nature of light. In practical applications, however, the signal-to-noise ratio (SNR) can be made high enough to make such noise relatively invisible to human observers.

It is well known to enhance the image data derived from these light sensing devices to promote both noise reduction and image sharpening. Image sharpening or crispening enhances the sharpness of edges and details of the digital image and, thus, greatly improves the subjective quality of the image. Such enhancement may be accomplished on a pixel-by-pixel basis utilizing the surrounding pixel values of each pixel to be enhanced to provide selectively weighted average pixel values for improved image sharpness and non-weighted average pixel values for noise reduction. Most image enhancing methods provide for both noise reduction and image sharpening; however, noise reduction and image sharpening are inherently contradictory since any reduction in noise provided by nonweighted averaging will reappear upon image sharpening by a selectively weighted average.

A sharpening method which is well known in the art as unsharp masking or Laplacian filtering is based on two-dimensional differentiation and amplifies high-frequency components of image signals. However, it is also well known that sharpening performed in accordance with the unsharp masking method not only enhances edges and details but it also amplifies noise which consists of high-frequency components.

Since sharpening performed in accordance with the unsharp masking method is always achieved at the expense of increasing noise visibility, its use is restricted by the amount of noise which becomes noticeable after the method is applied.

As a result, there is a need in the art for a method and apparatus for sharpening the edges and details of an image without amplifying the noise.

SUMMARY OF THE INVENTION

Embodiments of the present invention solve the above-identified problem by enhancing the edges and details of an image comprised of a plurality of pixel values received from a two-dimensional photosensitive array. In particular, embodiments of the present invention provide an output image which is the sum of the input image and its adaptively-amplified high frequency components, which are obtained by subtracting a low pass filtered image from the input image.

Specifically, an embodiment of the inventive method for enhancing image data defined by a two-dimensional array of pixel values comprises the steps of:

(1) selecting a pixel value to be enhanced from an array of pixel values;

(2) sampling a select group of pixel values surrounding the pixel value to be enhanced from the array of pixel values;

(3) determining a "blurred or defocused image" pixel value for the select group of pixel values surrounding the pixel value to be enhanced;

(4) adaptively changing the pixel value to be enhanced to an enhanced value as a function of the "blurred image" and a predetermined property of the pixel values in a further select group of pixel values surrounding the pixel value to be enhanced; and (5) selecting a succeeding pixel value to be enhanced from said array of pixel values and applying the above steps to provide an enhanced pixel value for the succeeding pixel value so selected until substantially all the pixel values from the array of pixel values are changed to enhanced values.

Let:

(a) $x(i,j)$ denote the pixel value to be enhanced at point $(i,j)$ of the two-dimensional array of pixel values;

(b) $W$ denote a select group of pixel values surrounding the pixel value to be enhanced,—$W$ will also be referred to as a "filter support"; and (c) $z(i,j)$ denote a "blurred image" for the select group of pixel values surrounding the pixel value to be enhanced, i.e., $z(i,j)$ is a "blurred image" of "filter support" $W$ which surrounds point $(i,j)$.

In a preferred embodiment of the present invention, "blurred image" $z(i,j)$ is obtained from a low pass filter of "filter support" $W$, which filters out high frequency components of the image. In accordance with this, $z(i,j)$ is determined as follows:

$$z(i,j) = \underset{k,l \text{ in } W}{\text{Sum}} [h_{kl} x(i - k, j - l)] \quad (1)$$

where low-pass filter coefficients $h_{kl}$ satisfy the following:

$$\underset{k,l \text{ in } W}{\text{Sum}} h_{kl} = 1 \quad (2)$$

As a result, in one embodiment of the present invention, coefficients $h_{kl}$ are chosen to have a uniform value for the total number of pixels, N, in "filter support" W. For this embodiment:

$$h_{k,l} = 1/N \text{ for all k and l in W} \quad (3)$$

and $$z(i,j) = \underset{k,l \text{ in } W}{\text{Sum}} [x(i-k, j-l)/N] \quad (4)$$

The high frequency component of the image at point (i,j) is given by:

$$x(i,j) - z(i,j) \quad (5)$$

In accordance with the present invention, the image at point (i,j) is sharpened by adaptively amplifying the high frequency components at point (i,j) by an amount c*s where c is an amplification factor, otherwise referred to as a sharpening constant, and s is an adaptive amplification factor. Adaptive amplification factor s depends on the noise power in the selected "filter support" W and s varies between 0 and 1.

The output pixel value of the inventive method, y(i,j), is given by:

$$y(i,j) = x(i,j) + c*s[x(i,j) - z(i,j)] \quad (6)$$

In one embodiment of the present invention, referred to as a continuous adaption method, s is given by:

$$s = 1 - e^2/\max[v(i,j), e^2] \quad (7)$$

where $e^2$ is an estimate of the noise power in the input image, referred to as the noise variance, and v(i,j) is a generalized statistical variance of the select group of pixel values surrounding the pixel value to be enhanced, i.e., point (i,j). In a preferred embodiment of the inventive method, v(i,j) is generated by the same "filter support" W as is used to determine "blurred image" z(i,j). v(i,j) is referred to as a local variance and, in a preferred embodiment, is given by:

$$v(i,j) = \underset{k,l \text{ in } W}{\text{Sum}} [h_{k,l} x^2(i-k, j-l)] - z^2(i,j) \quad (8)$$

Further, when $h_{k,l} = 1/N$, then:

$$v(i,j) = \underset{k,l \text{ in } W}{\text{Sum}} [x^2(i-k, j-l)/N] - z^2(i,j) \quad (9)$$

Advantageously, when N is a power of 2, z(i,j) and v(i,j) can be generated by an add-shift operation to save time when the inventive method is implemented in a processor wherein multiplications take longer to perform than additions.

In preferred embodiments of the present invention, the region of support of low pass filter W is centered at pixel (i,j). Further, and in general, the region of support should expand, i.e., include more pixels, as the resolution of the image increases or as the viewing distance from the image increases and vice versa. This can be understood qualitatively from the fact that as the resolution of an image increases, one needs to take in more of the image to provide a "blurred image."

As one can readily appreciate from eqn. (6), sharpening constant c controls the degree of sharpening in the output image. For example, when c=0 there is no sharpening whereas edges and details in the image become sharper as the value of c increases. However, if the value of c becomes too large, overshoots and undershoots near edges become too large and, therefore, visible. We have determined that a desirable range for c is 0<c<2.0, however, the optimum value of c for sharpness enhancement varies with a specific image as well as with a specific imaging system.

For the continuous adaption method, the enhanced pixel value y(i,j) comprises the sum of the input pixel value and the product of its high frequency component, x(i,j)−z(i,j), adaptive amplification factor s, where s is given by eqn. (7), and sharpening constant c. For pixel values where the local variance v(i,j) is much greater than the noise variance $e^2$, i.e., when $v(i,j) >> e^2$, the product c*s reduces to c and eqn. (6) reduces to:

$$y(i,j) = x(i,j) + c[x(i,j) - z(i,j)] \quad (10)$$

which is the conventional sharpening method called unsharp masking. This is also called Laplacian filtering when a 3×3 mask is used for low-pass filtering.

On the other hand, for pixel values where v(i,j) is close to or less than $e^2$, eqn. (6) reduces to:

$$y(i,j) = x(i,j) \quad (11)$$

i.e., the pixel values are unchanged in the output.

Thus, in accordance with the continuous adaption method and, as illustrated by eqn. (10) and (11), sharpening takes place only when the filtering point belongs to an edge whose presence results in a large value of v(i,j). Therefore, in effect, the noise variance $e^2$ controls what is sharpened and what is not. Since the noise variance is usually constant and invariant for a given imaging system, it can be determined from an examination of flat areas of typical input images. For example, the imaging system can be exposed to uniform light and the variance can be determined in accordance with methods well known to those of ordinary skill in the art.

Note that the accuracy with which the noise variation $e^2$ is determined is not critical to the performance of embodiments of the present invention because v(i,j) in the vicinity of an edge is usually much greater than $e^2$. As a result, even if an estimate of $e^2$ is very much different from the actual noise variance, embodiments of the present invention are robust enough so that no details in the input image will be lost.

A further embodiment of the present invention is useful when the noise in an input image is not severe, i.e., when v(i,j) obtained in the vicinity of an edge is always much greater than the noise variance over a flat area. In such an instance, the computational operations required to provide the continuous adaption adaptive amplification factor described above can be saved by using a binary adaption method, also referred to as a "hard-limiting" adaption method. In this method, a sharp transition between sharpening and no-sharpening is obtained instead of the smooth transition provided by the continuous adaption method. Specifically, in the "hard-limiting" adaption method:

$$s = 1 \text{ if } v(i,j) > ne^2$$

or $$s = 0 \text{ if } v(i,j) \leq ne^2$$

where n defines a multiple of the noise variance as a threshold value. In this embodiment, the output is given by:

$$y(i,j) = x(i,j) + c[x(i,j) - z(i,j)] \text{ if } v(i,j) > ne^2 \quad (13)$$

or $$y(i,j) = x(i,j) \text{ if } v(i,j) \leq ne^2$$

Still further embodiments of the present invention comprise the use of an M-ary decision for determining adaptive amplification factor s or the use of a table of predetermined values for determining adaptive amplification factor s.

Embodiments of the present invention may be used for sharpening color images. For example, a first embodiment of the present invention for sharpening a color image comprises the step of separating the color image into, for example, three primary colors in accordance with methods which are well known to those of ordinary skill in the art. Then, the next steps comprise applying embodiments of the present invention which were described above to sharpen each color primary image separately. Finally, the sharpened color primary images are combined to form the output sharpened color image in accordance with methods which are well known to those of ordinary skill in the art.

A second embodiment of the present invention for sharpening a color image comprises the step of transforming the color image into color coordinates which are comprised of a luminance component. For example, the luminance pixel value x(i,j) of an input color image array may be generated as follows:

$$x(i,j) = 0.299R(i,j) + 0.597G(i,j) + 0.114B(i,j) \quad (14)$$

where R(i,j), G(i,j), and B(i,j) are the red, green and blue primaries, respectively. Then, the next steps comprise applying embodiments of the present invention which were described above to sharpen the luminance pixel values. Next, the sharpened luminance pixel values are transformed back into the original color coordinates in accordance with methods which are well known to those of ordinary skill in the art. Finally, the sharpened color coordinate images are combined to form the output sharpened color image in accordance with methods which are well known to those of ordinary skill in the art. The second embodiment wherein only the luminance is sharpened is advantageous because it reduces the number of operations required to sharpen an image to approximately one-third of the number required for the first embodiment.

A third embodiment of the present invention for sharpening a color image comprises the step of transforming the color image into a color coordinate which is comprised of a luminance component as was done for the second embodiment described above. Then, the next steps comprise applying embodiments of the present invention which were described above to sharpen the luminance pixel values. Finally, each color primary signal is scaled by the ratio between the output and the input luminance signal, which ratio is given by:

$$f = max[y(i,j),0]/max[x(i,j),1] \quad (15)$$

where the use of the "max" function ensures the positiveness of the pixel values. As a consequence of this, the sharpened color primaries are determined in accordance with the following:

$$\begin{aligned} R'(i,j) &= f*R(i,j) \\ G'(i,j) &= f*G(i,j) \\ B'(i,j) &= f*B(i,j) \end{aligned} \quad (16)$$

Finally, the sharpened color primary images are combined to form the output sharpened color image in accordance with methods which are well known to those of ordinary skill in the art. This embodiment is advantageous because the saturation of colors in the input image is preserved in the output image.

DESCRIPTION OF THE DRAWINGS

The novel features that are considered characteristic of the present invention are set forth with particularity herein, both as to their organization and method of operation, together with other objects and advantages thereof, and will be best understood from the following description of the illustrated embodiments when read in connection with the accompanying drawings wherein.

DESCRIPTION OF THE PREFERRED EMBODIMENT

Figure 1:
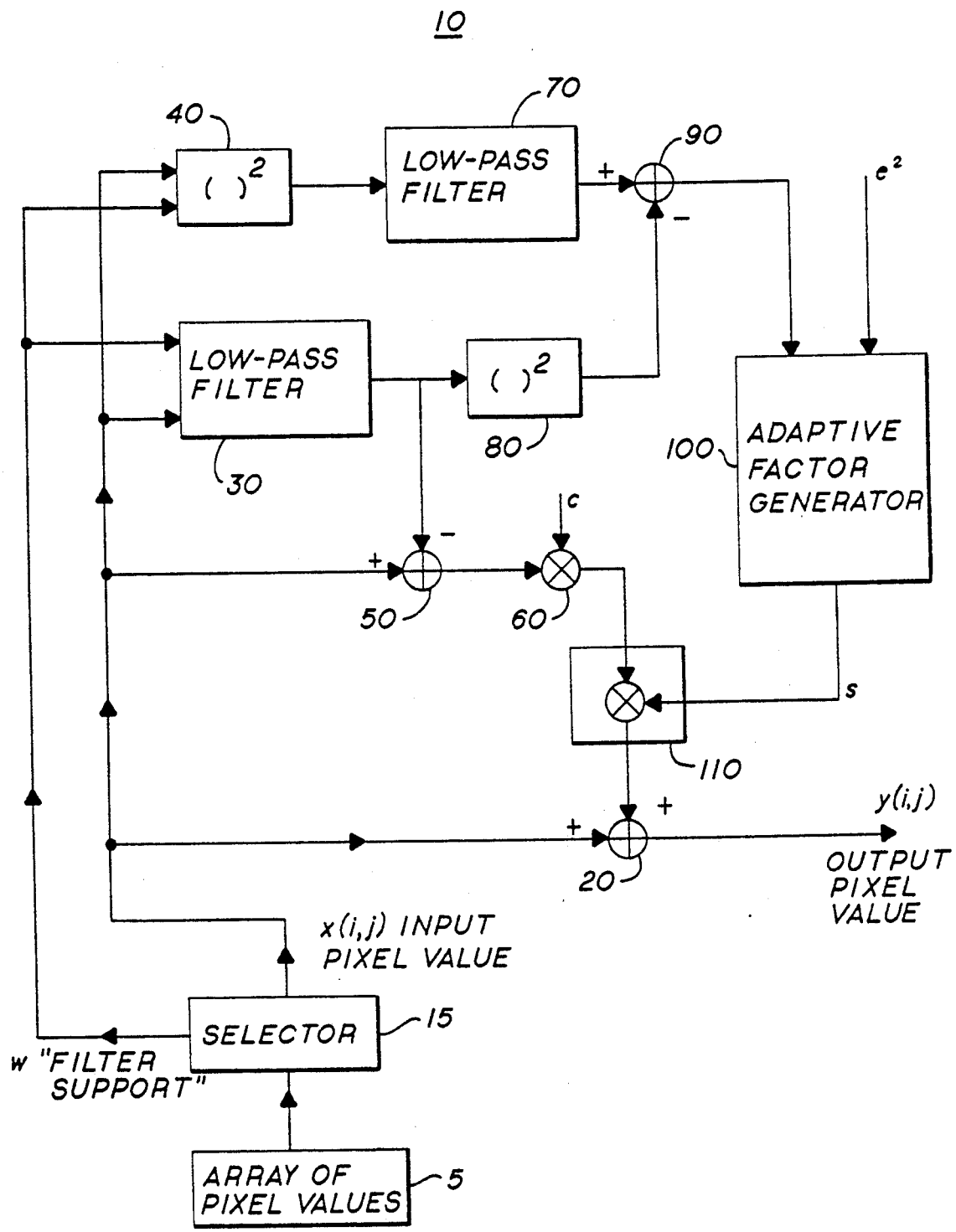
FIG. 1 is a schematic block diagram of a system for practicing the method of this invention for processing and enhancing image data.

Referring now to FIG. 1, there is shown at 10 a schematic block diagram of a system for practicing the method of this invention for processing and enhancing image data corresponding to a plurality of pixel values that may be derived from a two-dimensional photosensitive array. A plurality of image defining pixel values may be provided by a two-dimensional photosensitive array comprising a high resolution charge coupled device (CCD) or a charge injection device (CID) which receives image scene light in a well-known manner by way of an objective lens and shutter (not shown). The image sensing array comprises a plurality of image sensing elements or pixels preferably arranged in a two-dimensional area array wherein each image sensing pixel disposed at a point (i,j) converts the incident image defining scene light rays into a corresponding analog signal value. As is well known in the art, a typical array of such image sensing pixels are arranged in columns and rows.

As shown in FIG. 1, selector 15 of image processing and enhancing system 10 obtains a pixel value to be enhanced, x(i,j), from array of pixel values 5 and applies it as input to: (a) adder 20; (b) adder 50; (c) low-pass filter 30; and (d) squarer 40. Further, selector 15 obtains a predetermined, select group of pixel values which are disposed in the vicinity of the pixel value to be enhanced, i.e., "filter support" W, from array 5 and applies it as input to low-pass filter 30 and squarer 40. If "filter support" group W includes the pixel to be enhanced, then that value will also be applied as input to low-pass filter 30 and squarer 40. It should be understood that although FIG. 1 shows selector 15 applying the same "filter support" group W to low-pass filter 30 and to squarer 40, this does not limit the present invention. In fact, in certain embodiments, a first "filter support" group W may be applied as input to low-pass filter 30 and a second "filter support" group V may be applied as input to squarer 40.

The output from low-pass filter 30 is applied as input to squarer 80 and to a subtracting input of adder 50. The output from adder 50 represents the high frequency component of the pixel value at point (i,j) and it is applied as input to multiplier 60. Predetermined amplification factor c, also known as sharpening constant c, is also applied as input to multiplier 60 and the output from multiplier 60 is the amplified high frequency component at point (i,j). The amplified high frequency component at point (i,j) is applied as input to multiplier 110.

The output from squarer 40, which output represents the squared pixel value input thereto, is applied as input to low-pass filter 70. Note that low-pass filter 70 need not be the same type of low-pass filter as low-pass filter 30. The output from low-pass filter 70 is applied as input to adder 90. The output from squarer 80 represents the squared low frequency component of the pixel value at point (i,j) and it is applied as input to a subtracting input of adder 90. The output from adder 90 represents the variance of the pixel values at point (i,j) and it is applied as input to adaptive factor generator 100.

Predetermined noise power estimate $e^2$, also referred to below as the noise variance, is also applied as input to adaptive factor generator 100 and, in response, adaptive factor generator 100 produces adaptive amplification factor s as output, which output varies from 0 to 1.0. Adaptive amplification factor s is applied as input to multiplier 110.

The output from multiplier 110 represents the amplified and scaled high frequency component of the pixel value to be enhanced and it is applied as input to adder 20. Adder 20 adds the amplified and scaled high frequency component of the pixel value to be enhanced to the pixel value to be enhanced to provide the sharpened image output pixel value y(i,j) in accordance with the present invention.

Referring now to the flowchart of FIG. 2, the image enhancing process of the present invention will be explained in detail. A first pixel value x(i,j) to be enhanced is selected from a two-dimensional area array of an image (block 200, FIG. 2). Then, a predetermined, select group of pixel values which are disposed in the vicinity of the pixel value to be enhanced, i.e., "filter support" W, are selected from the array (block 210, FIG. 2).

FIG. 3 shows a plan view of a portion of an area array of photosensitive pixels for various embodiments of "filter support" W, i.e., embodiments 300-370, used in practicing the present invention. As shown in FIG. 3, N denotes the number of pixels in each embodiment. An appropriate pixel configuration of a "filter support" for use in a particular application may be determined by trial and error. However, in determining such an appropriate pixel configuration, it is important to note that the selection of an appropriate pixel configuration will depend on image resolution of the image and "viewing distance" from the image. This is because a "filter support" is used to provide a "blurred image" in the vicinity of the pixel value to be enhanced and the issue as to whether or not an image is blurred depends on image resolution and viewing distance. For example, the region covered by a "filter support" should expand, i.e., include more pixels, as either the resolution of the image or the viewing distance from the image increases, and vice versa, to provide an appropriate blur. This can be understood qualitatively from the fact that as the resolution of an image increases, one needs to take in more of the image to provide a "blurred image."

Figure 2:
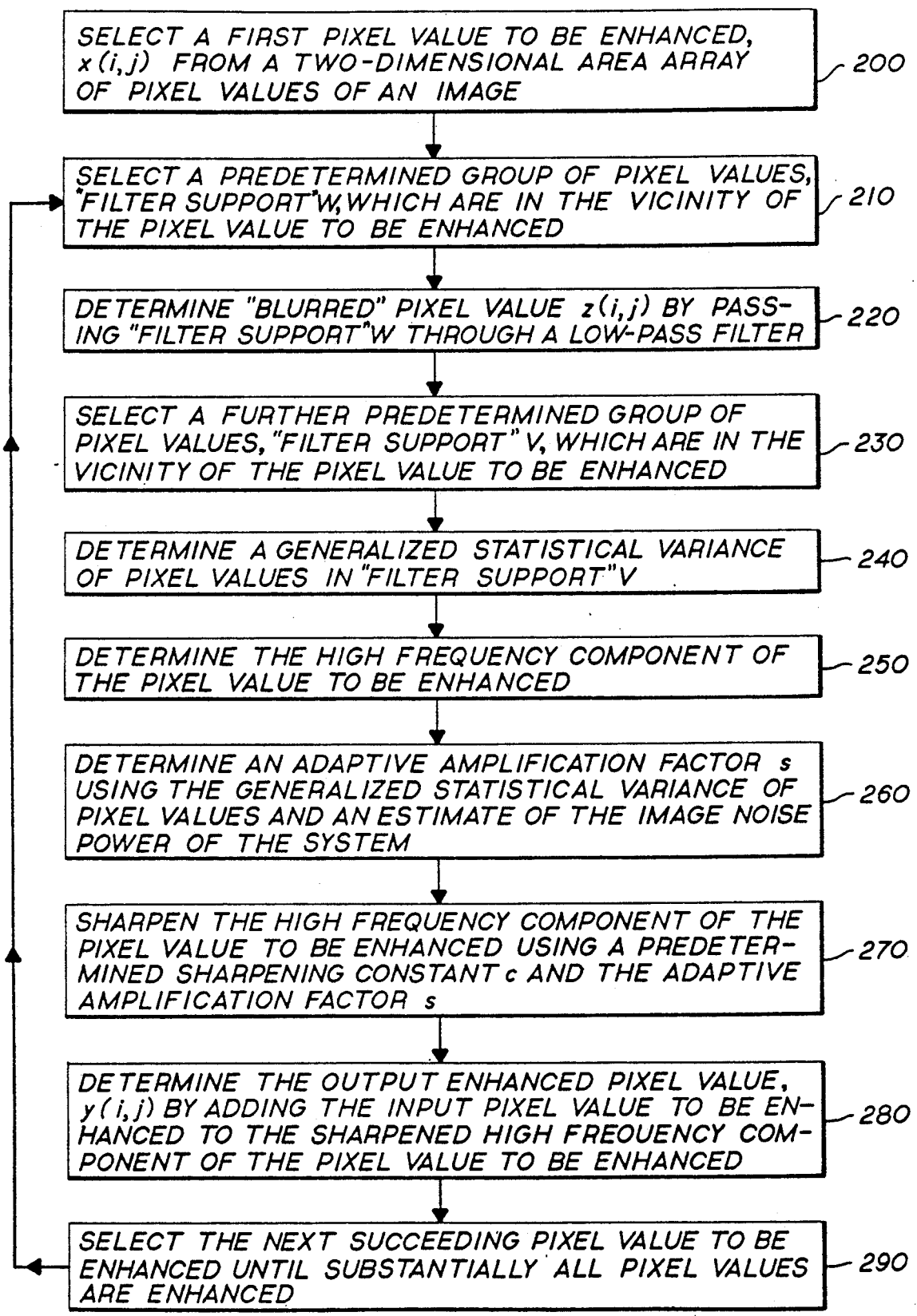
FIG. 2 is a flowchart illustrating the various steps of the inventive method.
Figure 3A:
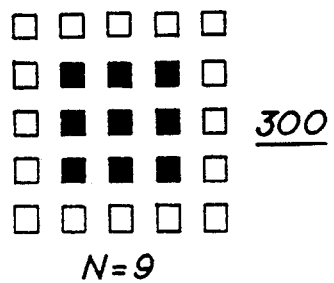
FIGS. 3A-3H show a plan views of a portion of an area array of photosensitive pixels for various embodiments of a "filter support" used in practicing the present invention.
Figure 3B:
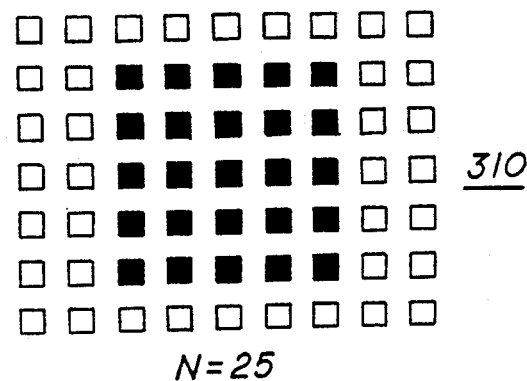
Figure 3C:
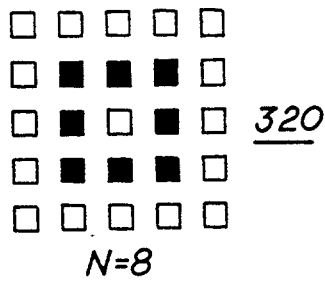
Figure 3D:
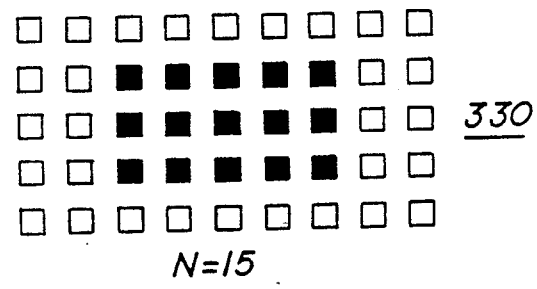
Figure 3E:
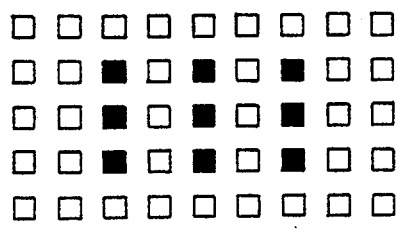
Figure 3F:
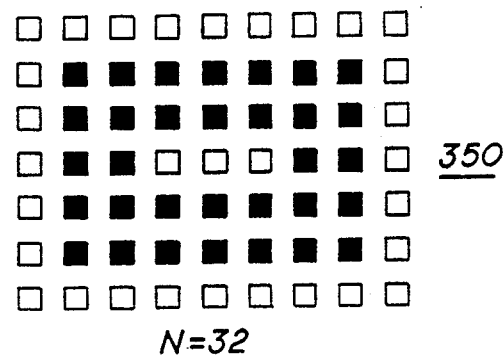
Figure 3G:
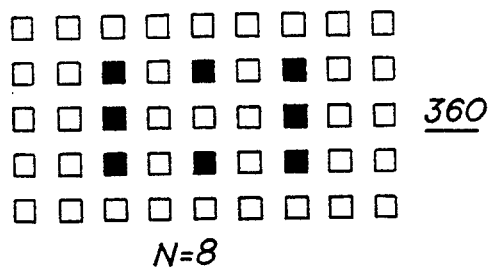
Figure 3H:
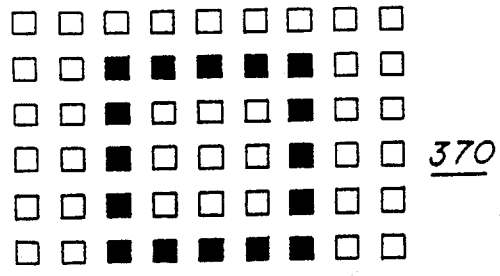
Figure 4A:
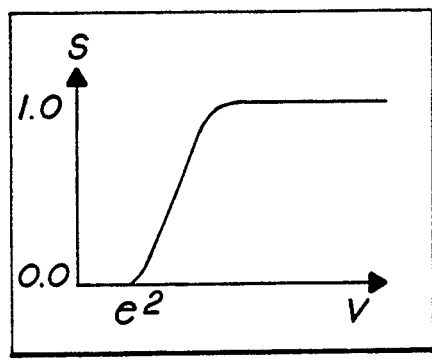
FIGS. 4A-4D show, in graphical form, various embodiments of adaptive amplification factor s used in practicing the present invention.
Figure 4B:
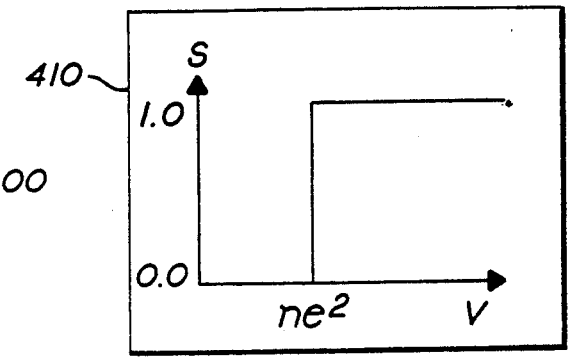
Figure 4C:
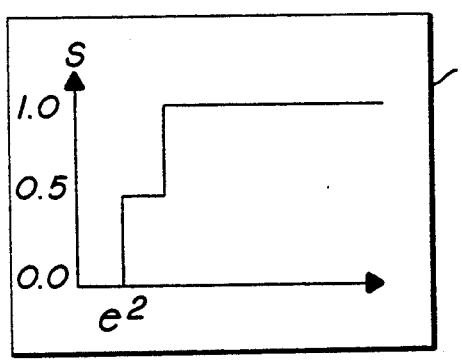
Figure 4D:
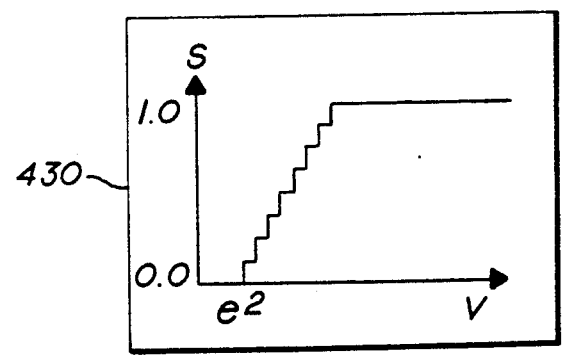

Referring back to the flowchart of FIG. 2, in the next step, a "blurred" pixel value z(i,j) is obtained from "filter support" W in accordance with the following (block 220, FIG. 2):

$$z(i,j) = \underset{k,l \text{ in } W}{\text{Sum}} [h_{kl} x(i - k, j - l)]$$

where $h_{kl}$ are coefficients which provide a low-pass filter and W is the "filter support" group for the low-pass filter. Filter coefficients $h_{kl}$ satisfy the following condition:

$$\underset{k,l \text{ in } W}{\text{Sum}} h_{kl} = 1$$

In one embodiment of the present invention, coefficients $h_{kl}$ are chosen to have a uniform value for each of the N pixels in "filter support" W and this is described as follows:

$$h_{kl} = 1/N \text{ for all } k \text{ and } l \text{ in } W.$$

As a result, in this embodiment:

$$z(i,j) = \underset{k,l \text{ in } W}{\text{Sum}} [x(i - k, j - l)/N]$$

Next, a predetermined, select group of pixels which are disposed in the vicinity of the pixel value to be enhanced, i.e., "filter support" V, are selected from the array (block 230, FIG. 2). Next, a generalized statistical variance of pixel values in "filter support" V is obtained (block 240, FIG. 2). In specific embodiments of the present invention, the generalized statistical variance, v(i,j), is generated by low-pass filtering the "filter support" group V. Although, "filter support" V and the low-pass filter for this step do not have to be the same as "filter support" W and the low-pass filter of the step shown in block 220, respectively, in a preferred embodiment of the inventive method they are all the same. As a result:

$$v(i,j) = \left\{ \underset{k,l \text{ in } W}{\text{Sum}} [h_{kl} x^2(i - k, j - l)] \right\} - z^2(i,j)$$

and for the case where $h_{kl}=1/N$:

$$v(i,j) = \underset{k,l \text{ in } W}{\text{Sum}} [x^2(i-k, j-l)/N] - z^2(i,j)$$

Advantageously, when N is a power of 2, z(i,j) and v(i,j) can be generated by an add-shift operation. This is advantageous because z(i,j) and v(i,j) can then be determined rapidly when the present invention is implemented in a processor wherein multiplications take longer to perform than additions.

Next, the high frequency component of the pixel value to be enhanced is determined as follows (block 250, FIG. 2):

$$x(i,j) - z(i,j)$$

Next, an adaptive amplification factor s which varies from 0 to 1 is determined using the generalized statistical variance of pixel values around the pixel value to be enhanced, v(i,j), and an estimate of the image noise power of the system (block 260, FIG. 2).

Next, the high frequency component of the pixel value to be enhanced is sharpened by use of a predetermined sharpening constant c and the adaptive amplification factor s as follows (block 270, FIG. 2):

$$c^*s[x(i,j) - z(i,j)]$$

Next the output enhanced pixel value y(i,j) is determined by adding the input pixel value to be enhanced to the sharpened high frequency component of the pixel value to be enhanced (block 280, FIG. 2):

$$y(i,j) = x(i,j) + c^*s[x(i,j) - z(i,j)]$$

Finally, the next succeeding pixel value to be enhanced is selected and one returns to the step set forth in block 210 of FIG. 2 until substantially all pixel values are enhanced (block 290, FIG. 2).

It should be clear to those of ordinary skill in the art that the present invention is not limited to sharpening an entire image and, in fact, it may be applied to sharpen a portion of an image. In such a case, the step of selecting the next succeeding pixel shown in block 290 of FIG. 2 would be appropriately altered.

FIG. 4 shows, in graphical form, embodiments 400-430 of adaptive amplification factor s which are used in practicing the present invention. For example, adaptive amplification factor s for curve 400 corresponds to a continuous adaption method, adaptive amplification factor s for curve 410 corresponds to a binary adaption method, adaptive amplification factor s for curve 420 corresponds to a ternary adaption method, and adaptive amplification factor s for curve 430 corresponds to an M-ary adaption method. In particular, in one embodiment of the inventive method, adaptive amplification s for curve 400 is given by:

$$s = 1 - e^2/max[v(i,j), e^2]$$

where $e^2$ is an estimate of the noise power in the input image, referred to as the noise variance, and v(i,j) is a generalized statistical variance of a select group of pixel values surrounding the pixel value to be enhanced, i.e., point (i,j).

Figure 5:
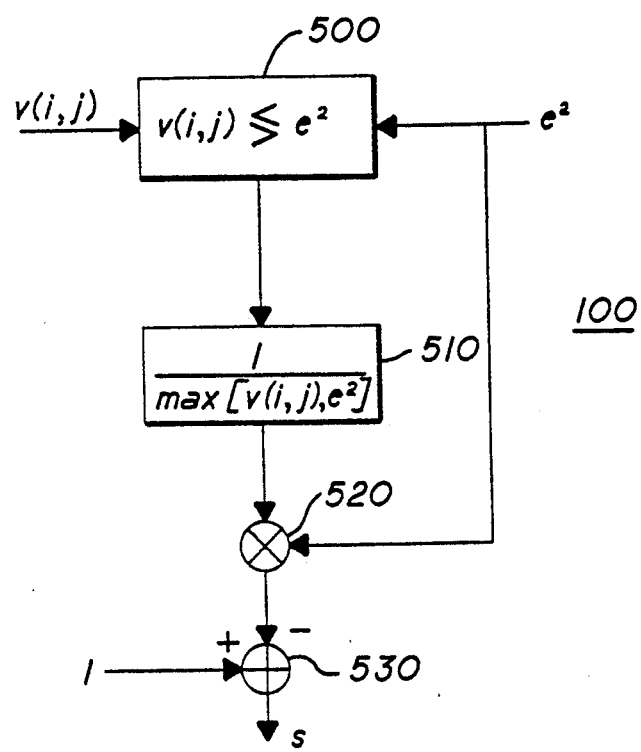
FIG. 5 is a schematic block diagram of an embodiment of adaptive factor generator 100 of system 10 shown in FIG. 1 which provides a continuous adaption adaptive amplification factor s.

FIG. 5 is a schematic block diagram of an embodiment of adaptive factor generator 100 of system 10 shown in FIG. 1 which provides adaptive amplification factor s indicated by continuous adaption curve 400 of FIG. 4. The output from adder 90 of FIG. 1 represents the variance of the pixel values at point (i,j), i.e., v(i,j), and it is applied as input to decision maker 500 along with predetermined noise power estimate $e^2$, where $e^2$ is a measure of the noise in the image produced by the imaging system. Decision maker 500 determines which of v(i,j) and $e^2$ is the larger and the larger value is applied as input to inverter 510 to form the reciprocal of the larger value. The output from inverter 510 is applied as input to multiplier 520 along with $e^2$. The output from multiplier 520 is applied as input to a subtracting input of adder 530 and "1" is applied as input to an adding input of adder 530. Finally, the output from adder 530 is adaptive amplification factor s.

As one can readily appreciate from the following equation:

$$y(i,j) = x(i,j) + c^*s[x(i,j) - z(i,j)]$$

sharpening constant c controls the degree of sharpening in the output image. For example, when c=0 there is no sharpening whereas edges and details in the image become sharper as the value of c increases. However, if the value of c becomes too large, overshoots and undershoots near edges become too large and, therefore, visible. We ave determined that a desirable range for c is $0 < c < 2.0$, however, the optimum value of c for sharpness enhancement varies with a specific image as well as with a specific imaging system.

For the continuous adaption method, the enhanced pixel value y(i,j) comprises the sum of the input pixel value and the product of its high frequency component, x(i,j)−z(i,j), with the adaptive amplification factor s and the sharpening constant c. For pixel values where the local variance v(i,j) is much greater than the noise variance $e^2$, i.e., when $v(i,j) >> e^2$, the product c*s reduces to c and the output y(i,j) is given by:

$$y(i,j) = x(i,j) + c[x(i,j) - z(i,j)]$$

which is the conventional sharpening method called unsharp masking.

On the other hand, for pixel values where v(i,j) is close to or less than $e^2$, the output y(i,j) is given by:

$$y(i,j) = x(i,j)$$

i.e., the pixel values are unchanged in the output.

Thus, in accordance with the continuous adaption method, sharpening takes place only when the filtering point belongs to an edge whose presence results in a large value of v(i,j). Thus, in effect, the noise variance $e^2$ controls what is sharpened and what is not. Since the noise variance is usually constant and invariant for a given imaging system, it can be determined, in accordance with methods well known to those of ordinary skill in the art, from an examination of flat areas of typical input images. For example, the imaging system can be exposed to uniform light and the noise variance can be determined in accordance with methods well known to those of ordinary skill in the art.

Note that the accuracy with which the noise variation $e^2$ is determined is not critical to the performance of embodiments of the present invention, i.e., the present invention provides a robust and reliable method, because v(i,j) in the vicinity of an edge is usually much greater than $e^2$. As a result, even if one uses an estimate for $e^2$ which is very much different from the actual noise variance, details in the input image will not be lost.

Figure 6:
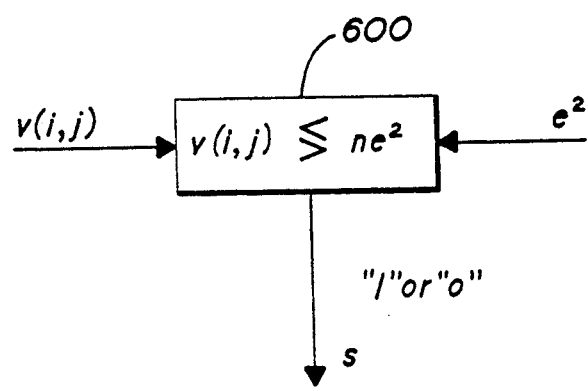
FIG. 6 is a schematic block diagram of an embodiment of adaptive factor generator 100 of system 10 shown in FIG. 1 which provides a binary adaption adaptive amplification factor s.

FIG. 6 is a schematic block diagram of an embodiment of adaptive factor generator 100 of system 10 shown in FIG. 1 which provides an adaptive amplification factor s indicated by binary adaption curve 410 of FIG. 4. This embodiment of the present invention is useful when the noise in an input image is not severe, i.e., in those instances when $v(i,j)$ obtained in the vicinity of an edge is always much greater than the noise variance over a flat area. In such instances, the computational operations required to provide the adaptive amplification factor described above in accordance with the continuous adaption method can be saved by using a binary adaption method, also referred to as a "hard-limiting" adaption method. In this method, one obtains a sharp transition between sharpening and no-sharpening instead of the smooth transition provided by the continuous adaption method. Specifically, in the "hard-limiting" adaption method:

$$s=1 \text{ if } v(i,j) > ne^2$$

or  (12)

$$s=0 \text{ if } v(i,j) \leq ne^2$$

where n defines a multiple of the noise variance as a threshold value. In this embodiment, the output is given by:

$$y(i,j) = x(i,j) + c[x(i,j) - z(i,j)] \text{ if } v(i,j) > ne^2$$

or $$y(i,j) = x(i,j) \text{ if } v(i,j) \leq ne^2$$

In FIG. 6, the output from adder 90 of FIG. 1, i.e., $v(i,j)$, is applied as input to decision maker 600 along with predetermined noise power estimate $e^2$. Decision maker 600 determines which of v and $ne^2$ is the larger, where n is a predetermined number. The output from decision maker 600 is adaptive amplification factor s; where s=1 if v is larger than $ne^2$, and s=0 otherwise.

A further embodiment of the present invention which is based on the principles of the embodiment shown in FIG. 6 may be fabricated wherein the output from decision maker 600 comprises an "ON" or "OFF" signal which is applied as input to a switch which replaces multiplier 110 in FIG. 1. In this further embodiment, when the switch is "ON" the pixel value is sharpened by its high frequency component whereas when the switch is "OFF" it is not. In addition, it should be clear to those of ordinary skill in the art as to how the ternary and M-ary adaptions indicated by curves 420 and 430 of FIG. 4 may be fabricated by, for example, suitable alterations of decision maker 500 of FIG. 5.

Further embodiments of the present invention comprise the use of a look-up table to determine complex adaptive amplification factors.

Embodiments of the present invention may be used for sharpening color images. For example, a first embodiment of the present invention for sharpening a color image comprises the step of separating the color image into, for example, three primary colors in accordance with methods which are well known to those of ordinary skill in the art. Then, the next steps comprise applying embodiments of the present invention which were described above to sharpen each color primary image separately. Finally, the sharpened color primary images are combined to form the output sharpened color image in accordance with methods which are well known to those of ordinary skill in the art.

A second embodiment of the present invention for sharpening a color image comprises the step of transforming the color image into color coordinates which are comprised of a luminance component. For example, the luminance pixel value $x(i,j)$ of an input color image array may be generated as follows:

$$x(i,j) = 0.299 R(i,j) + 0.597 G(i,j) + 0.114 B(i,j)$$

where $R(i,j)$, $G(i,j)$, and $B(i,j)$ are the red, green and blue primaries, respectively. Then, the next steps comprise applying embodiments of the present invention which were described above to sharpen the luminance pixel values. Next, the sharpened luminance pixel values are transformed back into the original color coordinates in accordance with methods which are well known to those of ordinary skill in the art. Finally, the sharpened color coordinate images are combined to form the output sharpened color image in accordance with methods which are well known to those of ordinary skill in the art. The second embodiment wherein only the luminance is sharpened is advantageous because it reduces the number of operations required to sharpen an image to approximately one-third of the number required for the first embodiment.

A third embodiment of the present invention for sharpening a color image comprises the step of transforming the color image into a color coordinate which is comprised of a luminance component as was done for the second embodiment described above. Then, the next steps comprise applying embodiments of the present invention which were described above to sharpen the luminance pixel values. Finally, each color primary signal is scaled by the ratio between the output and the input luminance signal which is given by:

$$f = max[y(i,j),0]/max[x(i,j),1]$$

where the use of the "max" function ensures the positiveness of the pixel values. As a consequence of this, the sharpened color primaries are determined in accordance with the following:

$$R'(i,j) = f^*R(i,j)$$

$$G'(i,j) = f^*G(i,j)$$

$$B'(i,j) = f^*B(i,j)$$

Finally, the sharpened color primary images are combined to form the output sharpened color image in accordance with methods which are well known to those of ordinary skill in the art. This embodiment is advantageous because the saturation of colors in the input image is preserved in the output image.

Other embodiments of the invention, including additions, subtractions, deletions and other modifications of the preferred disclosed embodiments of the invention will be obvious to those skilled in the art and are within the scope of the following claims. For example, it should be clear to those of ordinary skill in the art that embodiments of the present invention are not limited to the use of a single noise estimate $e^2$ for adaptive sharpening. Further, the sharpening of color images is not restricted to use of red, green and blue as the color primaries or to the luminance function described above.

What is claimed is:

1. A method for enhancing image data defined by a two-dimensional array of pixel values comprising the steps of:
   selecting a pixel value to be enhanced from an array of pixel values;
   sampling a select group of pixel values surrounding the pixel value to be enhanced from the array of pixel values;
   determining a "blurred image" pixel value for the select group of pixel values surrounding the pixel value to be enhanced;
   determining a high frequency component of the pixel value to be enhanced by subtracting the "blurred image" from the pixel value to be enhanced;
   adaptively changing the pixel value to be enhanced to an enhanced value by adaptively amplifying the high frequency component as a function of: the variance of the pixel values in a further select group of pixel values surrounding the pixel value to be enhanced, a predetermined estimate of the noise power, and a predetermined sharpening amount; and thereafter adding the adaptively amplified high frequency component to the pixel value to be enhanced; and
   selecting a succeeding pixel value to be enhanced from said array of pixel values and applying the above steps to provide an enhanced pixel value for the succeeding pixel value so selected until substantially all the pixel values from at least a portion of the array of pixel values are changed to enhanced values.

2. The method of claim 1 wherein the step of adaptively amplifying the high frequency component comprises multiplying the high frequency component by the predetermined sharpening amount and by an adaptive amount which is a function of the variance and the predetermined estimate of the noise power.

3. The method of claim 2 wherein the variance is determined by low-pass filtering the square of the pixel values in the further select group.

4. The method of claim 2 wherein the adaptive amount is a set of values which provide a substantially smooth transition from 0 to 1.

5. The method of claim 4 wherein the set of values are determined by subtracting a quotient from 1 wherein the numerator of the quotient is the predetermined estimate of the noise power and the denominator of the quotient is the larger of the variance and the predetermined estimate of the noise power.

6. The method of claim 3 wherein the adaptive amount has a first value if the variance is larger than the product of a predetermined amount and the predetermined estimate of the noise power and the adaptive amount has a second value if the variance is less than or equal to the product.

7. The method of claim 1 wherein the select group and the further select group are the same.

8. The method of claim 2 wherein the select group and the further select group are the same.

9. The method of claim 3 wherein the select group and the further select group are the same and wherein the low-pass filtering for determining the "blurred image" and the low-pass filtering for determining the variance are the same.

10. The method of claim 4 wherein the select group and the further select group are the same.

11. The method of claim 5 wherein the select group and the further select group are the same.

12. The method of claim 6 wherein the select group and the further select group are the same and wherein the low-pass filtering for determining the "blurred image" and the low-pass filtering for determining the variance are the same.

13. A method for enhancing color image data defined by a two-dimensional array of pixel values comprising the steps of:
   separating the color image data into a predetermined number of select color coordinate two-dimensional arrays of pixel values;
   performing the following steps for each of the predetermined number of select color coordinate two-dimensional arrays of pixel values:
      selecting a pixel value to be enhanced from an array of pixel values;
      sampling a select group of pixel values surrounding the pixel value to be enhanced from the array of pixel values;
      determining a "blurred image" pixel value for the select group of pixel values surrounding the pixel value to be enhanced;
      determining a high frequency component at the pixel value to be enhanced by subtracting the "blurred image" pixel value from the pixel value to be enhanced;
      adaptively changing the pixel value to be enhanced to an enhanced value by adaptively amplifying the high frequency component as a function of: the variance of the pixel values in a further select group of pixel values surrounding the pixel value to be enhanced, a predetermined estimate of the noise power, and a predetermined sharpening amount; and thereafter adding the adaptively amplified high frequency component to the pixel value to be enhanced; and selecting a succeeding pixel value to be enhanced form said array of pixel values and applying the above steps to provide an enhanced pixel value for the succeeding pixel value so selected until substantially all the pixel values from at least a portion of the array of pixel values are changed to enhanced values; and
   converting the predetermined number of enhanced predetermined color coordinate two-dimensional arrays of pixel values into enhanced color image data.

14. A method for enhancing color image data defined by a two-dimensional array of pixel values comprising the steps of:
   converting the color image data into a two-dimensional array of luminance pixel values;
   performing the following steps for the two-dimensional array of luminance pixel values:
      selecting a luminance pixel value to be enhanced from an array of luminance pixel values;
      sampling a select group of luminance pixel values surrounding the luminance pixel value to be enhanced from the array of luminance pixel values; determining a "blurred image" luminance pixel value for the select group of luminance pixel values surrounding the luminance pixel value to be enhanced;

determining a high frequency component of the luminance pixel value to be enhanced by subtracting the "blurred image" luminance pixel value from the luminance pixel value to be enhanced;

adaptively changing the luminance pixel value to be enhanced to an enhanced value by adaptively amplifying the high frequency component as a function of: the variance of the luminance pixel values in a further select group of luminance pixel values surrounding the luminance pixel value to be enhanced, a predetermined estimate of the noise power, and a predetermined sharpening amount; and thereafter adding the adaptively amplified high frequency component to the luminance pixel value to be enhanced; and selecting a succeeding luminance pixel value to be enhanced from said array of luminance pixel values and applying the above steps to provide an enhanced luminance pixel value for the succeeding luminance pixel value so selected until substantially all the luminance pixel values from at least a portion of the array of luminance pixel values are changed to enhanced values; and converting the two-dimensional array of luminance pixel values into enhanced color image data.

15. A method for enhancing color image data defined by a two-dimensional array of pixel values comprising the steps of:

converting the color image data into a two-dimensional array of luminance pixel values and into a predetermined number of select color coordinate two-dimensional arrays of pixel values;

performing the following steps for the two-dimensional array of luminance pixel values:

selecting a luminance pixel value to be enhanced from an array of luminance pixel values;

sampling a select group of luminance pixel values surrounding the luminance pixel value to be enhanced from the array of luminance pixel values;

determining a "blurred image" luminance pixel value for the select group of luminance pixel values surrounding the luminance pixel value to be enhanced;

determining a high frequency component of the pixel value to be enhanced by subtracting the "blurred image" luminance pixel value from the luminance pixel value to be enhanced;

adaptively changing the luminance pixel value to be enhanced to an enhanced value by adaptively amplifying the high frequency component as a function of: the variance of the luminance pixel values in a further select group of luminance pixel values surrounding the luminance pixel value to be enhanced, a predetermined estimate of the noise power, and a predetermined sharpening amount; and thereafter adding the amplified high frequency component to the luminance pixel value to be enhanced; and selecting a succeeding luminance pixel value to be enhanced from said array of luminance pixel values and applying the above steps to provide an enhanced luminance pixel value for the succeeding luminance pixel value so selected until substantially all the luminance pixel values from at least a portion of the array of luminance pixel values are changed to enhanced values;

converting the predetermined number of color coordinate two-dimensional arrays of pixel values into enhanced predetermined color coordinate two-dimensional arrays by multiplying the pixel value of each of the predetermined number of color coordinate two-dimensional arrays by a weighting factor which is a function of the enhanced luminance pixel value and the luminance pixel value; and converting the predetermined number of enhanced predetermined color coordinate two-dimensional arrays of pixel values into enhanced color image data.

16. The method of claim 15 wherein the weighting factor is determined by dividing the larger of the enhanced luminance pixel value and 0 by the larger of the luminance pixel value and 1.

* * * * *